(No Model.)
E. A. KOCH.
CUTTING SHARE FOR PLOWS.
No. 335,936. Patented Feb. 9, 1886.
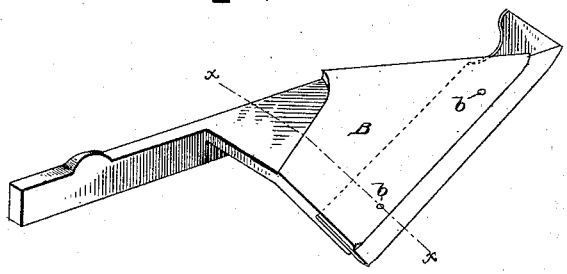
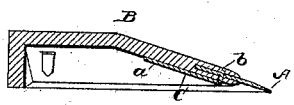
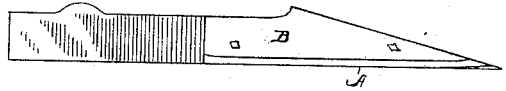
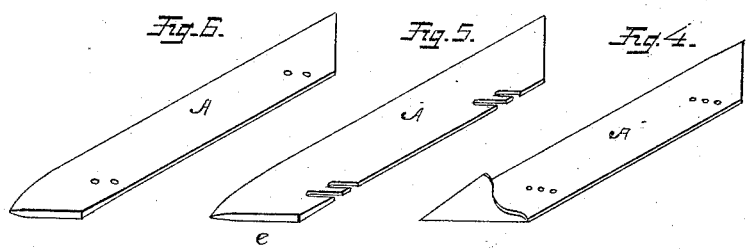
WITNESSES
INVENTOR
Edouard Alphonse Koch
by R.G. Dyrenforth
his Attorney

UNITED STATES PATENT OFFICE.

EDOUARD ALPHONSE KOCH, OF WATERLOO, LOUISIANA, ASSIGNOR OF ONE-HALF TO GEORGE STAMBAUGH, OF SAME PLACE.

CUTTING-SHARE FOR PLOWS.

SPECIFICATION forming part of Letters Patent No. 335,936, dated February 9, 1886.

Application filed May 23, 1885. Serial No. 166,479. (No model.)

*To all whom it may concern:*

Be it known that I, EDOUARD ALPHONSE KOCH, a citizen of the United States, residing at Waterloo, in the parish of Pointe Coupée and State of Louisiana, have invented certain new and useful Improvements in Cutting or Tilling Implements; and I do hereby declare the following to be a full, clear, and exact description of the invention, such as will enable others skilled in the art to which it appertains to make and use the same.

This invention relates to certain new and useful improvements in cutting and tilling implements.

The object of the invention is to provide a cutting-edge which may be readily adjusted to compensate for wear, and in that way present a uniform cutting-edge to the soil upon which the implement is used, to obviate the necessity of sharpening the cutting-edge, and to protect the plowshare itself from wear.

With these objects in view the invention consists of a thin cutting-edge of any suitable material, preferably steel, secured adjustably to the operative edge of the share, and provided with means for the attachment of suitable securing devices for holding it in proper position on the edge of the share.

Further, the invention consists of a peculiar form of share adapted for the attachment of the cutting-edge, and of novel means for attaching the cutting-edge to the share.

In order that the advantages of my invention may be clearly understood and others enabled to make and use the same, I will now proceed to describe it in connection with the accompanying drawings, in which—

Figure 1 is a side elevation of the share provided with the cutting-edge and the means for securing the same. Fig. 2 is a section through line $x \, x$ of Fig. 1. Fig. 3 is a side elevation of a modified form of device for adjustably securing the cutting-edge in place. Fig. 4 is a view showing the form of cutting-edge used in the device shown in Fig. 1—that is, with the point shaped to serve as a colter. Fig. 5 is a similar view of the cutting-edge, though shown without a colter-bend, used when the means shown in Fig. 3 are employed. Fig. 6 is a view of the cutting-edge without the colter-bend, and showing the forward end thickened.

In plows as usually constructed the mold-board is provided at its lower edge with a supplemental piece called a "share," which is made detachable, for the purpose of allowing it to be removed and sharpened as it becomes dulled by use, or substituted by another when it has become worn so much as to incapacitate it for further use. The difficulty encountered in the sharpening of these shares leads to discarding them before they are entirely worn out, and the frequent purchase of new ones renders the use of plows very expensive, and in order to obviate the necessity of purchasing such a large part of the plow as the share so often, and to secure a sharp edge at all times, I employ a thin strip of steel, as indicated in the drawings by the letter A. This strip is of a uniform thickness throughout its entire width, so that, inasmuch as it may be moved to project any desired distance from the share, a perfect cutting-edge is secured at all times, and as the cost of this strip of steel is very much less than that of the share a better and at the same time cheaper cutting-edge is obtained.

The preferred manner of securing this strip adjustably to the share, so that it may be moved out to compensate for the wear, is shown in the drawings. This consists in forming the cutting-edge of the share with a groove or channel of a width about equal to the thickness of the cutting-strip to be applied thereto; but at the cutting-edge of the share the lips forming the groove are to be so constructed as almost or altogether to meet when the cutting-strip is removed, so that when the cutting-strip is placed in position these lips will grip it with a spring-clasp, and also providing the share with spring-pins which pass through the share and holes in the cutting-strip.

In the drawings, B is the share, and C represents spring-pins, which consist each of the shank, $a$, of spring metal, secured at one end rigidly to the face of the share, and provided at their free ends with the pin $b$, which is of a form to coincide with the openings in the share and the cutting-blade. The strength of this spring portion $b$ is such that its resiliency will keep the pins in position and hold them against any ordinary strain which may be imposed upon them in the ordinary use of the implement. When the blade becomes worn, it is only necessary to move the same out a short distance and allow the spring-pins to enter one of the pin-holes nearer its inner edge.

To avoid accidental bending of the cutting-edge by coming in contact with a hard substance, or of becoming bent by the ordinary strain put upon it in use, the end may be, and preferably is, turned over, as shown in the drawings, to present the sharp edge $e$ of a double thickness of metal at the point where the greatest wear comes.

To secure the greatest strength of point and at the same time obtain the advantage of a colter, the cutting-strip may be turned upward, as shown in Figs. 1 and 4.

Although I have particularly described the spring-pins as the means for securing the cutting-edge in place, they may be substituted by ordinary rivets countersunk on both sides, passing through the share, in which case both surfaces must be smooth and offer no resistance to the proper use of the implement and no lodging-place for earth or other material. When this form of fastening is employed, the blade is provided with the slots, as shown in Fig. 5, in which slots the rivets rest, and longitudinal movement of the strip is prevented. The direction of the slots is from the rear edge toward the point, whereby the resistance offered the implement secures the cutting-edge the more firmly in its place. The slots are cut to different depths and are parallel to each other, the deepest being nearest the point of the cutting-strip. By this arrangement the point is brought forward as well as the edge protruded as the wear progresses and the shallower slots are brought into use. By having a thin bushing or strips of zinc, copper, or other non-rusting metal interposed between the adjustable cutter or blade and the sides of the matrix or the jaws of the share the cutter will not rust fast.

The adjustable cutter or blade may be employed with any cutting or tilling implement suitably adapted with a matrix or jaws, and the cutting-tool being inserted the same as in the share. It is also purposed to apply a stronger cutting-edge with dovetailed shoulders for extraordinary use in lands full of roots, stones, &c., which edge, I claim, can be produced cheaper than sharpening.

Having thus described my invention, what I claim as new, and desire to secure by Letters Patent, is—

1. In a cutting or soil-tilling implement, the matrix or share provided at its lower edge with a groove or channel, the lips or sides of which nearly or quite meet when the cutting strip or blade is removed, thus constituting a spring-clasp which clings closely to the strip or blade when inserted, in combination with the cutting strip or blade of uniform thickness in the direction of its width, and having slots or holes for retention and adjustment, and the fastening device whereby the blade is held, but is capable of being moved outward and forward as the edge and point wear away, all as described.

2. The combination, with the share or matrix having the groove or channel and the spring-pins, of the blade having the holes for the reception of the spring-pins, whereby the blade is secured and position regulated.

3. The combination, with the share having the groove or channel and provided with the spring-pins, of the cutting-blade provided with a series of holes for the reception of the spring-pins, whereby the blade is retained in place and its position regulated.

4. The cutting-blade for a plow or cultivator, having its body of uniform thickness in the direction of its width, and having its end or point turned up to form a colter, substantially as described.

In testimony whereof I affix my signature in presence of two witnesses.

EDOUARD ALPHONSE KOCH.

Witnesses:
R. G. DYRENFORTH,
GEO. STAMBAUGH.